(12) United States Patent
Takagi et al.

(10) Patent No.: US 7,497,094 B2
(45) Date of Patent: Mar. 3, 2009

(54) GLASS MELTING FURNACE AND METHOD FOR PRODUCING GLASS

(75) Inventors: Masataka Takagi, Otsu (JP); Noriyuki Yoshida, Otsu (JP); Takamasa Akimoto, Otsu (JP); Tatuya Takaya, Otsu (JP)

(73) Assignee: Nippon Electric Glass Co., Ltd., Shiga-Ken (JP)

( * ) Notice: Subject to any disclaimer, the term of this patent is extended or adjusted under 35 U.S.C. 154(b) by 410 days.

(21) Appl. No.: 10/536,029

(22) PCT Filed: Nov. 28, 2003

(86) PCT No.: PCT/JP03/15210

§ 371 (c)(1),
(2), (4) Date: Dec. 7, 2005

(87) PCT Pub. No.: WO2004/050568

PCT Pub. Date: Jun. 17, 2004

(65) Prior Publication Data

US 2006/0101859 A1    May 18, 2006

(30) Foreign Application Priority Data

Nov. 29, 2002  (JP)  ............................. 2002-348097
Oct. 27, 2003  (JP)  ............................. 2003-365693

(51) Int. Cl.
C03B 5/193    (2006.01)
C03B 5/225    (2006.01)
C03B 5/187    (2006.01)

(52) U.S. Cl. .................. 65/134.5; 65/135.1; 65/135.4; 65/157; 65/178; 65/346; 65/347

(58) Field of Classification Search ................ 65/134.1, 65/134.5, 134.9, 135.1–135.4, 157, 146, 65/178, 346, 347
See application file for complete search history.

(56) References Cited

U.S. PATENT DOCUMENTS

| 2,886,495 | A |   | 5/1959  | Jerger, Jr.                  |
| 3,622,296 | A | * | 11/1971 | Buehl ................... 65/32.5 |
| 3,929,440 | A | * | 12/1975 | Oldfield ................ 65/32.5 |
| 6,871,514 | B2 | * | 3/2005 | Muschik et al. ........ 65/33.9 |

(Continued)

FOREIGN PATENT DOCUMENTS

JP    55-106532    8/1980

(Continued)

Primary Examiner—Eric Hug
(74) Attorney, Agent, or Firm—J.C. Patents

(57) ABSTRACT

A charged glass raw material B is melted in a melting tank 10 by heating with a burner 31 and by heating with electrodes 12, to form molten glass G. Then, the molten glass G flows into a tank additionally provided as a noble gas dissolving tank 20 through a throat 40. The noble gas dissolving tank 20 is provided with a noble gas dissolving device 53, and the noble gas dissolving device 53 is provided with sixteen noble gas inlets 22 for introducing a helium or neon gas supplied to a hearth through heat resistant gas introduction tubes 21 into the noble gas dissolving tank 20. Bubbles of a helium gas A having a purity of 99% are blown out from the noble gas inlets 22 in volumes such that the bubbles have an average diameter of 80 mm or less in the molten glass G.

16 Claims, 6 Drawing Sheets

U.S. PATENT DOCUMENTS

2002/0121113 A1* 9/2002 Gohlke et al. ............... 65/134.4
2006/0174655 A1* 8/2006 Kobayashi et al. ......... 65/134.5

FOREIGN PATENT DOCUMENTS

| | | |
|---|---|---|
| JP | 61-21922 | 1/1986 |
| JP | 62-223028 | 10/1987 |
| JP | 06-329422 | 11/1994 |
| JP | 07-172862 | 7/1995 |
| JP | 64-028245 | 1/1998 |
| JP | 2583790 | 8/1998 |
| JP | 11-255519 | 9/1999 |
| JP | 2000-239023 | 9/2000 |
| WO | WO02/079107 | 10/2002 |

* cited by examiner

GLASS MELTING FURNACE AND METHOD FOR PRODUCING GLASS

TECHNICAL FIELD

The present invention relates to a glass melting furnace capable of improving homogeneity of a glass product by reducing bubble defects in glass, and to a method of manufacturing glass using the glass melting furnace.

BACKGROUND ART

Over many years, glass manufacturing industry has aimed at manufacturing homogeneous glass products containing no contaminants, bubbles, and the like through melting at high efficiency, and supplying glass products that meet demands. The glass manufacturing industry has attempted to attain an object of manufacturing homogeneous glass in various glass products, and numerous inventions have been made to attain the object. Although factors causing inhomogeneous glass such as stones, cords, and precipitation of heterogeneous crystals in glass can be eliminated, an object of removing bubbles completely remains unattained. The removal of bubbles generally employs a method involving: addition of fining agents in a raw material composition; expansion and elevation of bubbles of very small diameters through a redox reaction of fining agents; and deaeration of the bubbles from molten glass.

As shown in FIG. 11, in general, a glass melting furnace for performing continuous production of glass is often constituted by a melting tank 10 for melting glass by heating, and a fining chamber 30 for deaerating bubbles from molten glass G after the melting. In such a continuous production method, a glass raw material B including various glass raw material powder and glass cullet is homogeneously mixed in advance, and the glass raw material B is continuously charged from an inlet 11 in the melting tank 10 of the melting furnace formed of a refractory material R. Inside of the melting tank 10 is heated to high temperatures by a burner 31 and an electrode 12 for a vitrification reaction of the glass raw material B. Then, oxygen bubbles and the like are generated through a redox reaction of fining agents added into the glass raw material B in the fining chamber 30 connected to the melting tank 10, to expand bubbles having very small diameters of a carbon dioxide gas and the like generated during the vitrification reaction and to elevate the bubbles to a surface of the molten glass G for fining. Thereafter, the molten glass G is homogenized with a stirrer 51 provided in a feeder 50, formed into a predetermined shape in a forming part, and annealed into a glass product.

When continuous production is not performed, the production is performed in a so-called batch production furnace employing a crucible of quartz, alumina, or the like, a crucible of another refractory material, or a vessel (pot) formed of a heat resistant metal containing platinum as shown in FIG. 12. In this case, molten glass is homogenized through processes of melting and fining in one tank. To be specific, glass raw materials are charged into a refractory vessel 70 protected by a refractory material R and provided inside the refractory material R. The glass raw materials in the heat resistant vessel 70 are indirectly heated by a heating element 41. A series of processes including fining is performed in the same tank for the molten glass G produced through a vitrification reaction. The molten glass G is homogenized with a stirrer 51, and is allowed to flow out from an outlet 60 provided at a bottom of a melting tank. The molten glass G is formed into a predetermined shape and annealed into a glass product.

In order to attain an object of more assuredly fining bubbles, which are defects generated in the molten glass, Patent Document 1 describes a method of deaerating bubbles of very small diameters by introducing a gas such as air, oxygen, or argon as bubbles into the molten glass through a bubbling nozzle provided in the above-described fining chamber. Further, Patent Document 2 discloses a technique referred to as vacuum degassing for deaerating bubbles in the molten glass for homogenization by intentionally adjusting a pressure of a glass melting atmosphere to a pressure lower than an atmospheric pressure.

Further, Patent Document 3 describes use of a helium atmosphere for remelting a glass cullet to prevent reboiling of bubbles. However, Patent Document 3 includes no description regarding an effective helium content in glass or the like, and lacks detail. Patent Document 4 describes the use of helium in a dry gas to be bubbled. However, Patent Document 4 includes no description regarding specific modes of a bubbling device or a helium content in glass, and thus cannot be applied to a glass manufacturing apparatus allowing mass production. Patent Document 5 also describes the use of helium bubbling. However, Patent Document 5 includes no specific description regarding a device for bubbling helium or a helium content in glass, and thus cannot be applied to a glass manufacturing apparatus allowing mass production.

[Patent Document 1] Japanese Utility Model Registration No. 2583790
[Patent Document 2] JP-A 2000-239023
[Patent Document 3] JP-A 06-329422
[Patent Document 4] JP-A 07-172862
[Patent Document 5] U.S. Pat. No. 3,622,296

DISCLOSURE OF THE INVENTION

Various melting furnaces obtained by improving a melting furnace shown in FIG. 11 or 12 have been disclosed as melting furnaces accelerating deaeration of bubbles from molten glass by use of fining agents. However, the melting furnaces are subjected to restrictions by various factors such as use, a production, a glass material, and a glass raw material, and are far from melting furnaces capable of homogenizing molten glass efficiently. A method of adding fining agents to glass raw materials is easily employed without question, but careful studies are required on various factors such as the type or amount of fining agents, a glass material to be added, and a heating method. Even if optimal selections of the factors are made once, there are disadvantages in that the factors are apt to be affected by a glass flow rate, a melting temperature, a melting atmosphere, and the like. Some of the fining agents provide large influences such as environmental problems and are hardly added in large amounts.

Stirring through bubbling employing a bubbling nozzle or stirring with a stirrer is often combined with other methods, and the use of stirring alone leaves concerns. The stirring method is rather useful means for aiding a deaeration effect by the above-described fining agents and an auxiliary method for enhancing the effect in combined use with other methods, and has not yet reached a level of realizing large effects in use of the method alone.

A technique of accelerating deaeration of bubbles from the molten glass by applying a pressure reducing technique or vacuum technique to the molten glass at high temperatures involves removal of bubbles from the molten glass and easy partial loss of molten glass components through vaporization at the same time. Thus, environmental problems associated with collection of the molten glass components and problems such as degradation of the device itself by vaporized substances are pointed out. Further, a large device is required for treating a large volume of molten glass, but precise maintenance of a reduced pressure or vacuum environment involves problems in that precise and continual maintenance is required.

The inventors of the present invention have conducted extensive studies in view of the above circumstances, and an object of the present invention is therefore to provide: a glass melting furnace allowing stable mass production of molten glass without bubbles through a method of manufacturing glass through melting, which is the most generally used method in glass manufacturing industry; and a method of manufacturing glass using the glass melting furnace.

That is, the glass melting furnace of the present invention is a glass melting furnace for melting glass raw materials by heating to form molten glass, characterized by including: an inlet for charging glass raw materials; an outlet for taking out molten glass; a melting tank for retaining the glass raw materials and the molten glass for a predetermined period of time; heating means for heating the glass raw materials and molten glass charged into the melting tank; and noble gas dissolving means for supplying helium and/or neon from a noble gas inlet, and diffusing and mixing helium and/or neon into the molten glass to dissolve a predetermined concentration or more of helium and/or neon in the molten glass.

In the above-described constitution, the inlet for charging the glass raw materials and the outlet of the molten glass may be shared, or a plurality of each may be provided. The heating source may employ a method through electricity, burning of various fuels, electromagnetic wave, or the like. One method may be used alone, or a plurality of methods may be used in combination for heating. Any heating device for controlling heating can be used without particular limitation as long as it is a device having no reactivity inhibiting a vitrification reaction, causing no problems in structural strength at high temperatures, having a size allowing heating of glass raw materials at once in a volume in accordance with the purpose, and constructed with construction materials in accordance with the purpose of melting a glass material.

The supply of helium and/or neon into the molten glass may be continues or intermittent. The glass melting furnace may be provided with one or a plurality of noble gas inlets for supplying helium and/or neon. A sectional shape of the noble gas inlet is not particularly limited.

The noble gas dissolving means is for: diffusing helium and/or neon in an atomic state into glass in a molten state; mixing helium and/or neon to disperse homogeneously; and dissolving helium and/or neon in a network structure formed of elements constituting the glass and having a relatively large bonding strength such that helium and/or neon exists in a trapped state without being bonded to the network structure. The noble gas dissolving means is actually provided to connect to the melting surface directly or indirectly.

The size or shape of the noble gas dissolving means is not particularly limited as long as the above-described functions are realized. One noble gas dissolving means may be provided, or a plurality thereof may be used in combination in accordance with a production of glass, for example.

Further, the phrase "dissolving a predetermined concentration or more of helium and/or neon" specifically indicates dissolving of helium and/or neon in the molten glass such that a concentration of helium and/or neon is 0.0001 μl (microliter)/g (0° C., 1 atm) or more, preferably 0.001 μl/g (0° C., 1 atm), more preferably 0.01 μl/g (0° C., 1 atm) in the molten glass.

Further, the glass melting furnace of the present invention is characterized in that the noble gas dissolving means is at least partially immersed in the molten glass, in addition to the above-described constitution.

Here, the phrase "noble gas dissolving means is at least partially immersed in the molten glass" indicates that the noble gas dissolving means is used in a state of being partially or totally immersed in the molten glass.

Further, the glass melting furnace of the present invention is characterized in that the noble gas dissolving means is provided in at least one position selected from the inside, upper side, lower side, and side of the molten glass, in addition to the above-described constitution.

The noble gas dissolving means is provided in at least one position selected from the inside, upper side, lower side, and side of the molten glass, to thereby assuredly diffuse or mix helium and/or neon into the molten glass. The noble gas dissolving means may be provided at a plurality of positions. For example, two noble gas dissolving means may be provided with one provided on a side and the other provided on a lower side. Alternatively, one noble gas dissolving means may be provided to extend from a lower side to a side.

Further, the glass melting furnace of the present invention is characterized in that the noble gas dissolving means contains at least one device selected from the group consisting of a heating device, a pressure reducing device, and a centrifugal force generating device.

The heating device, the pressure reducing device, or the centrifugal force generating device may be a part of a device having other functions, or may realize those functions with other devices.

Embodiments of the heating device include: a burner for burning combustible fuels such as hydrocarbons, oxygen, and hydrogen; a resistance heating element utilizing electricity; an electrode for direct application of current; a dielectric heater utilizing high frequency current; and an electromagnetic wave irradiator such as an infrared irradiator. One heating device may be used, or a plurality thereof may be used in combination in accordance with the type or use of glass to be melted. The heating device is provided as a device separate from a heating device for glass melting. Any type of pressure reducing device may be employed as long as the device is capable of reducing a pressure to an atmospheric pressure or less and has heat resistance. Any centrifugal force generating device may be employed without particular limitation as long as the device is capable of providing the molten glass with centrifugal force generated through high-speed rotation.

Further, the glass melting furnace of the present invention is characterized in that the heating means is provide with at least one tank constituted by a heat resistant vessel, in addition to the above-described constitution.

Here, the heat resistant vessel constituting the heating device must have a sufficient level of heat resistance for preventing corrosion of the vessel through a chemical reaction with glass easily caused at high temperatures etc.

The heat resistant vessel preferably has low reactivity with a melting atmosphere and sufficient strength for retaining the molten glass at high temperatures. To be specific, any material having high temperature heat resistance including a metal material such as platinum or ceramics may be used, and a plurality of materials may be used in combination.

Further, the glass melting furnace of the present invention is characterized in that the noble gas dissolving means generates a flow of a helium and/or neon gas in a direction at a vector angle of 0° to 80°, 50° to 130°, or 100° to 180° with respect to a flow direction of the molten glass.

Here, the phrase "flow of a helium and/or neon gas" indicates a flow of helium and neon perceived as a gas until helium and neon diffuse in the molten glass, not a flow of helium and neon in a state of monoatomic molecules diffusing in the molten glass. That is, helium and neon are allowed to flow in a gas state at a specific flow angle with respect to the flow of the molten glass from the melting tank toward a forming region, to thereby realize faster diffusion and mixing than those realized by simply bringing both flows into contact with each other in a static state.

Of the vector angles, a vector angle between the both flows set to 100 to 180° provides particularly effective actions. Such a vector angle may be effectively applied to a molten glass of a glass material having a high viscosity glass melt and a composition inhibiting actions of helium and neon through bubbling or the like, and especially to molten glass of a glass composition having a small alkali content or substantially no alkali content. Meanwhile, a vector angle between both flows set to 50 to 130° may be applied to non-alkali glass, but provides moderate diffusion and mixing, and dissolution of atoms compared with those in a case employing a larger vector angle. In order to accelerate diffusion and mixing, and dissolution, other conditions such as temperature and pressure must be set more strictly. A vector angle between both flows set to 0 to 80° may be applied to a glass material having a composition which greatly facilitates diffusion and mixing of helium and/or neon. However, even with a glass material of a composition having a high viscosity inhibiting diffusion of helium and/or neon such as non-alkali glass, helium and/or neon may be diffused and mixed into the molten glass by using other homogenizing devices in combination.

Further, the glass melting furnace of the present invention is characterized in that the noble gas dissolving means is formed of a heat resistant metal and/or ceramics, in addition to the above-described constitution.

The noble gas dissolving means is used under a high temperature environment, and may be used in a state of being immersed in the molten glass as required. Thus, the noble gas dissolving means preferably employs a heat resistant metal having appropriate heat resistance and corrosion resistance or ceramics.

The noble gas dissolving means preferably has the following functions for realizing its ability assuredly and rapidly. That is, the noble gas dissolving means preferably has functions including: a function of heating a helium and/or neon gas before the gas is introduced into the molten glass; a function of precisely adjusting a flow rate of the gas to be introduced; a function of adjusting volumes of bubbles of the introduced gas formed into bubbles in the molten glass; and a function of mutually and finely adjusting each of the functions from other physical values such as set values or measured values of a furnace molten glass temperature, a temperature of a refractory material, a furnace ambient pressure, a volume of a dissolved gas, a glass flow rate, and the like.

Here, the function of heating a helium and/or neon gas before the gas is introduced into the molten glass is an important function for rapidly diffusing and mixing the gas into the molten glass by heating the gas for dissolution of the gas. To be specific, the function may employ heating of the gas with a heating element for indirect heating, heating thereof with a radiator, or the like. However, the simplest method involves heat exchange with a waste gas while the waste gas is collected for efficient use of the waste gas and for effective operation in terms of energy balance. The function of precisely adjusting a flow rate of the gas to be introduced allows dealing with fluctuation in properties of a glass state due to furnace operation conditions through fine adjustment based on precise measurement of the flow rate. The function of adjusting volumes of bubbles of the introduced gas formed into bubbles in the molten glass may be realized together with the function of adjusting a flow rate of the gas. Further, the function may employ a method of providing a jig for an intermittent gas flow at a position where the molten glass and the gas are initially brought into contact with each other. Further, devices such as adjustment of the size or shape of a gas outlet to suppress a bubble diameter as small as possible may be made. The function of mutually and finely adjusting each of the functions from other physical values such as set values or measured values of a furnace molten glass temperature, a temperature of a refractory material, a furnace ambient pressure, a volume of a dissolved gas, a glass flow rate, and the like allows maintenance of a fining state of the molten glass in the furnace in an optimally controlled state by establishing a system for monitoring the physical values as needed. Based on the results of the monitoring system, automation of a system for providing appropriate action by using a computer or the like allows maintenance of stable manufacturing conditions with minimum labor.

The heat resistant metal or ceramics to be used here must have low reactivity with the molten glass at high temperature and low reactivity with other construction materials or the like used in combination, in addition to heat resistance. In particular, the heat resistant metal or ceramics are exposed to a reaction gas or vaporized gas from the molten glass for a long period of time, and a material must be selected in consideration of reactivity with a gas phase or corrosion properties.

Further, the glass melting furnace of the present invention is characterized by further including noble gas degassing means for degassing a gas containing helium and/or neon from the molten glass after helium and/or neon is diffused and mixed into the molten metal, which is provided in at least one position selected from the inside, upper side, lower side, and side of the molten glass.

The noble gas degassing means provided in at least one position selected from the inside, upper side, lower side, and side of the molten glass allows effective degassing of helium and/or neon diffused and mixed in the molten glass from the molten glass, to thereby perform favorable fining of the molten glass. The noble gas degassing device is useful when glass has a particularly high viscosity and a heavy burden is placed on the melting device itself without degassing, or when an absolute volume of a gas component in glass is very large and degassing is insufficient with a normal fining chamber. A mode of the noble gas degassing device corresponds to that of the noble gas dissolving means described above, so the same descriptions are omitted.

Further, the glass melting furnace of the present invention is characterized in that the noble gas degassing means includes at least one device selected from the group consisting of a heating device, a pressure reducing device, and a centrifugal force generating device, in addition to the above-described constitution.

The heating device, the pressure reducing device, and the centrifugal force generating device may each have the same constitution as that of the noble gas dissolving means or a different constitution from that of the noble gas dissolving means.

That is, examples of the heating device include: a burner for burning combustible gaseous fuels such as hydrocarbons, oxygen, and hydrogen, or combustible liquid/solid fuels; a resistance heating element utilizing electricity; an electrode for direct application of current; a dielectric heater utilizing high frequency current; and an electromagnetic wave irradiator such as an infrared irradiator. One heating device may be used, or a plurality thereof may be used in combination in accordance with the type or use of glass to be melted. The heating device is provided as a device separate from a heating device for glass melting or devices constituting the noble gas dissolving means, or may be shared with other devices. Any type of pressure reducing device may be employed as long as the device is capable of reducing a pressure to an atmospheric pressure or less and has heat resistance. The pressure reducing device is preferably provided with a cooling function because performance of the device itself must be maintained in the vicinity of the device at high temperature. Any centrifugal force generating device may be employed without particular limitation as long as the device is capable of imparting the molten glass with centrifugal force generated through high speed rotation.

The above-described noble gas dissolving means or noble gas degassing means may operate on the molten glass at different times in time series, or the dissolving means and the degassing means may operate at substantially the same time. However, for operation at the same time, other environmental conditions for helium or neon to dissolve rapidly into the molten glass, that is, conditions such as a temperature, an atmosphere, and a pressure must be sufficiently adjusted.

Further, the glass melting furnace of the present invention is characterized in that the noble gas degassing means includes a noble gas collection chamber on an upper side the molten glass, in addition to the above-described constitution.

Here, the term "noble gas collection chamber" is a space on an upper side of the molten glass and for temporarily accumulating helium or neon degassed from the molten glass.

The shape or size of the noble gas collection chamber is not particularly limited as long as the chamber has a heat resistant structure and is capable of maintaining a substantially airtight state. An upper space of the melting tank or fining chamber may be used as the noble gas collection chamber, or a closed space provided separately from the melting tank, the fining chamber, or the like may be used as the noble gas collection chamber. The noble gas collection chamber requires a temperature measuring device, a dust collector, or the like. Further, the noble gas collection chamber may be connected to a gas separation device capable of collecting at high efficiency a noble gas such as helium or neon from a high temperature mixed gas containing gases such as carbon dioxide, steam, oxygen, and nitrogen generated through a vitrification reaction, for using the noble gas again.

When the upper space of the molten glass in the heat resistant vessel is used as the noble gas collection chamber, the noble gas collection chamber not necessarily needs to be provided over an entire region of the upper space, and may be provided in a part of the region. As a spatial positional relationship, the noble gas collection chamber needs not be provided directly above the molten glass, and may be provided obliquely upward.

Further, the glass melting furnace of the present invention is characterized in that the noble gas dissolving means is provided with a plurality of noble gas inlets, in addition to the above-described constitution.

The advantages for the noble gas dissolving means provided with a plurality of noble gas inlets are described below. That is, in order to enhance an overall dissolved volume of a helium and/or neon gas into molten glass when the noble gas is introduced into the molten glass, a contact interface between the noble gas and the molten glass must be expanded. Even if a large volume of the noble gas is supplied intermittently from one noble gas inlet, bubbles formed from the noble gas aggregate with one another into one large bubble while the bubbles elevate through the molten glass having a high viscosity. Thus, even if a supply volume of the noble gas is increased, an area of contact interface with the molten glass cannot be increased. In contrast, when the noble gas is supplied from the plurality of noble gas inlets, a phenomenon of the bubbles formed from the noble gas to aggregate into a large bubble is suppressed, and most bubbles elevate through the molten glass while maintaining small diameters. Thus, the area of contact interface with the molten glass can be increased even with a relatively small supply volume of the noble gas, to thereby increase an overall dissolved volume of the noble gas into the molten glass.

Meanwhile, even if an excess number of noble gas inlets are provided for one glass melting furnace, a greatly accelerating effect on dissolution of helium or neon in the molten glass is small considering labor or required cost. However, numerous noble gas inlets may be provided to further increase a dissolved volume of helium or neon if a burden such as cost is not taken into consideration. Thus, the number of the noble gas inlets of helium or neon is in a range of preferably 2 to 100,000, more preferably 4 to 10,000, still more preferably 6 to 5,000, yet more preferably 10 to 3,000, still yet more preferably 11 to 2,000, furthermore preferably 13 to 1,000, most preferably 15 to 500.

A density of the noble gas inlets provided is limited by diameters of the bubbles to be formed. When simple bubbling is employed, diameters of bubbles to be formed are hardly adjusted to less than 1 cm, and an interval between the noble gas inlets must be 1 cm or more. Thus, the density of the noble gas inlets provided must be 10,000 inlets/$m^2$ or less. The density is preferably 9,000 inlets/$m^2$ or less, more preferably 8,000 inlets/$m^2$ or less, still more preferably 7,000 inlets/$m^2$ or less. When devices such as reducing of diameters of bubbles formed by applying a mechanical shear force on the bubbles is made in addition to simple bubbling, the density of the noble gas inlets is 1,000,000 inlets/$m^2$ or less, preferably 900,000 inlets/$m^2$ or less, more preferably 800,000 inlets/$m^2$ or less.

Further, the glass melting furnace of the present invention is characterized in that the plurality of noble gas inlets are provided on a hearth and/or on a furnace wall, in addition to the above-described constitution.

As described above, the noble gas inlets are preferably provided on a heat resistant hearth retaining the molten glass, or on a furnace wall continuing from the hearth. Obviously, the noble gas inlets may be provided at a boundary between the hearth and the furnace wall.

Further, the glass melting furnace of the present invention is characterized in that the plurality of noble gas inlets are each formed of a metal having a melting point of 1,000° C. or higher, in addition to the above-described constitution.

Such a constitution allows adjustment of a temperature where helium and/or neon is brought into direct contact with the molten glass to high temperatures of 1,000° C. or more.

Further, the glass melting furnace of the present invention is characterized in that the noble gas dissolving means is provided in a noble gas dissolving tank connected downstream of the melting tank, in addition to the above-described constitution. A fining chamber may be connected downstream of the noble gas dissolving tank.

A connecting part between the melting tank and the noble gas dissolving tank may be: a heat resistant tube; a tilted tub; a part having a function of allowing flow of glass melted in the melting tank to the noble gas dissolving tank; or a wall surface dividing both tanks, having properties such as heat resistance and corrosion resistance, and provided with a passage part. The connecting part is not limited to a part having a structural connecting part (bonding part), and only needs to have a structure allowing transfer of the molten glass from the melting tank to the noble gas dissolving tank as a result. For example, the connecting part may have a structure not structurally bonded, and allowing a steady flow of the molten glass overflowing from a predetermined position in the melting tank along a refractory rod-like structure for directing the molten glass to the noble gas dissolving tank. In this case, the refractory rod-like structure for directing the molten glass is provided in the melting tank, but is not directly provided in the noble gas dissolving tank downstream.

The noble gas dissolving tank preferably has an inner wall surface formed of a refractory brick having a refractory temperature of 1,200° C. or higher, or a heat resistant metal having a melting point of 1,200° C. or higher. To be specific, the inner wall surface of the noble gas dissolving tank is coated with the above-described refractory brick or heat resistant metal (or both of the refractory brick and heat resistant metal). Such a constitution allows diffusion of helium or neon into the molten glass in an environment of 1,200° C. or higher, which thus allows efficient dissolution of helium or neon in the molten glass.

The refractory brick having a refractory temperature of 1,200° C. or higher may be an inorganic oxide, nitride, or the like having a plurality of components or a single component. A component ratio may be changed as required, and a plurality of refractory bricks having totally different components may be used in combination, to thereby improve homogeneity of the molten glass having helium or neon dissolved therein. Further, the use of the plurality of refractory bricks in combination may prevent elution of components inhibiting elevation of bubbles into the molten glass, and prevent a surface state in which fine bubbles are apt to be trapped at an interface between the refractory material and the molten glass.

The heat resistant material having a melting point of 1,200° C. or higher and having a plurality of metal components or a single metal component may provide an environment without formation of unwanted bubbles in the glass not to inhibit diffusion and dissolution of helium or neon, by taking into sufficient consideration, for example, its reactivity with the molten glass. The reason for specifying the melting point of 1,200° C. is that the melting point is required for allowing efficient dissolution of helium or neon in glass as described above regarding the refractory temperature.

Further, the glass melting furnace of the present invention is characterized in that the refractory brick contains at least one selected from the group consisting of $SiO_2$, $ZrO_2$, $Al_2O_3$, MgO, $Cr_2O_3$, C, and $WO_3$, in addition to the above-described constitution.

Here, the refractory brick containing at least one selected from the group consisting of $SiO_2$, $ZrO_2$, $Al_2O_3$, MgO, $Cr_2O_3$, C, and $WO_3$ indicates that the refractory brick contains at least one of silica (or quartz or silicon dioxide), zirconia (or zirconium oxide), alumina (or aluminum oxide), magnesia (or magnesium oxide), chromium oxide, carbon, and tungsten oxide.

$SiO_2$ may be used as a refractory material for melting optical glass or the like. $SiO_2$ is a material having heat resistance appropriate for constituting the noble gas dissolving tank for dissolving helium or neon, and is a suitable material for dissolving helium or neon into molten glass having components of high purity. $ZrO_2$ is suitable for dissolving helium or neon into molten glass requiring high temperature melting at 1,500° C. or higher. $Al_2O_3$ is preferably used as a construction material (lining material) for the noble gas dissolving tank similar to $SiO_2$. MgO and $Cr_2O_3$ are preferable for allowing construction of the noble gas dissolving tank at low building cost. C or $WO_3$ may be preferably used when helium or neon is dissolved in glass requiring special components.

Further, the glass melting furnace of the present invention is characterized in that the heat resistant metal contains at least one selected from the group consisting of Pt, Ir, Os, Re, W, Ta, Rh, Hf, Ru, Tc, Pd, Mo, Ti, Zr, and Nb, in addition to the above-described constitution.

Here, the heat resistant metal containing at least one selected from the group consisting of Pt, Ir, Os, Re, W, Ta, Rh, Hf, Ru, Tc, Pd, Mo, Ti, Zr, and Nb indicates that the heat resistant metal contains 1 mass % of at least one component as a heat resistant metal material selected from the group consisting of platinum, iridium, osmium, rhenium, tungsten, tantalum, rhodium, hafnium, ruthenium, technetium, palladium, molybdenum, titanium, zirconium, and niobium. The metal material may be used alone or as an alloy, and different metal materials may be used in accordance with a part to be used. A composite material of ceramics and a metal may also be used.

Further, the method of manufacturing glass of the present invention is a method of manufacturing glass for melting glass raw materials by heating to form molten glass, characterized by including: introducing bubbles containing helium and/or neon and having an average diameter of 150 mm or less into molten glass; and diffusing and mixing helium and/or neon into the molten glass to incorporate a predetermined volume of helium and/or neon into the molten glass.

Bubbles containing helium and/or neon and having an average diameter of 150 mm or less are formed to increase an area of contact interface between helium or neon and the molten glass. The diameters of the bubbles are preferably small, and the number thereof is preferably large. However, the sizes and number of the bubbles for realizing effective fining vary depending on a volume of glass. That is, for glass having a large volume, many bubbles with small diameters are preferably formed. In contrast, bubbles having an average diameter of more than 150 mm causes scattering of a molten glass material covering the bubbles when the bubbles elevate through the molten glass, reach the surface of the molten glass, and disappear. As a result, a gas component at the surface of the molten glass is entrained, to cause countless entrained bubbles on the surface of the molten glass. Thus, fine bubble defects are generated on the melt surface to waste a fining effect for eliminating fine bubbles of helium or neon to provide homogeneous glass. An average diameter of bubbles containing helium and/or neon is preferably 150 mm or less, more preferably 120 mm or less, still more preferably 100 mm or less, yet more preferably 80 mm or less.

The type of refractory material to be used for the glass melting furnace of the present invention is not particularly limited as long as the glass melting furnace of the present invention has required heat resistance and the refractory material is capable of maintaining structural strength at high temperatures with time. The refractory material often employs ceramics or a heat resistant metal. However, because there are many porous refractory materials, attention must be paid such that materials that carelessly dissipate helium or neon out of the glass melting furnace are not used in positions where helium or neon is to be retained.

The method, means, or device for heating is not particularly limited for the heating means that can be employed in the glass melting furnace of the present invention. The heating means may employ indirect heating or direct heating. The heating means may employ a method of heating by electricity, burning of various fuels, or electromagnetic wave. One method may be used, or a plurality thereof may be used in combination. The heating device needs to have no reactivity inhibiting a vitrification reaction, cause no problems in structural strength at high temperatures, have a size allowing heating of glass raw materials at once in a volume in accordance the purpose, and be constructed with construction materials in accordance with the purpose of melting a glass material.

The glass material that can be melted in the glass melting furnace of the present invention generally contains multicomponent oxides of inorganic elements as main components. Here, the glass material containing multicomponent oxides of inorganic elements as main components indicates that the glass material contains two or more types of oxides and intentionally contains a total amount of the two or more types of oxides of 50% or more in mass %. A glass composition containing a single component and a plurality of components mixed as impurities does not correspond to the multicomponent oxides of the present invention. For example, a glass composition containing a single component in a content of about 99% in mass % and a plurality of components in a content in hundredths, that is, a content of 0.09 mass % or less does not correspond to the glass material containing multicomponent oxides. Thus, the present invention is not applied to quartz glass for optical fiber or high purity quartz glass similar thereto. The present invention is not applied to non oxide glass such as fluoride glass or fluoride phosphate glass containing a large amount of fluorine as anions, chalcogenide glass, chalcohalide glass, or oxynitride glass.

The uses for the glass manufactured through the present invention are not particularly limited. That is, the glass of the present invention is suitable for manufacture of glass products requiring high technology such as: sheet glass for a substrate of a liquid crystal display element; sheet glass used for a plasma display; cover glass for packaging a solid image sensor; tube glass for backlight installed in a liquid crystal display; high strength crystallized glass; various lens components used for optical components; and low melting point powder glass.

A glass composition to be manufactured by using the glass manufacturing apparatus of the present invention, that is, a glass product containing multicomponent oxides manufactured by melting glass raw materials has such a feature that a helium and/or neon content is 0.0001 to 2 µl/g (0° C., 1 atm). Helium and/or neon present in the glass product is in a state of being trapped in interstices of a glass network structure constructed by other glass components. The present invention refers to such a state as a state of being dissolved in glass.

Bubble diameters are measured by: photographing bubbles through a neoceram window, which is transparent crystallized glass for observing inside of a furnace, by using a photographic device for photographing at high temperatures; and subjecting image data to image analysis for calculation. A helium and/or neon content in the glass can be measured with a quadrupole mass spectrometer. Gas analysis with the quadrupole mass spectrometer involves: placing a glass sample for measurement into a platinum plate; retaining the platinum dish in a sample chamber under vacuum of $10^{-5}$ Pa (that is, $10^{-8}$ Torr); heating the platinum dish; and directing a gas discharged after the heating to the quadrupole mass spectrometer having a measurement sensitivity of 0.0001 µL/g for analysis.

The present invention provides the following effects.

(1) The glass melting furnace of the present invention allows rapid and efficient diffusion and mixing, and dissolution of helium and/or neon into the molten glass, and thus provides a fining effect on bubbles of very small diameters of 0.1 mm or less in the molten glass, which are hardly fined.

(2) The glass melting furnace of the present invention has a concentration of helium and/or neon to be dissolved of 0.0001 µl/g (0° C., 1 atm) or more, and thus is capable of effectively advancing fining of glass and reducing a time period required for forming a homogeneous glass state.

(3) The glass melting furnace of the present invention has the noble gas dissolving means at least partially immersed in the molten glass, and thus is capable of bringing helium and/or neon into contact with the molten glass in a state of being most easily diffused and mixed, and realizing an optimal fining effect.

(4) The glass melting furnace of the present invention has the noble gas dissolving means provided in at least one position selected from the inside, upper side, lower side, and side of the molten glass, and thus can be applied to manufacturing processes corresponding to various melting or forming systems. The glass melting furnace employing a melting system in accordance with market demands and product specifications allows abundant supply of a glass product having sufficient properties.

(5) The glass melting furnace of the present invention has the noble gas dissolving means including at least one device selected from the group consisting of a heating device, a pressure reducing device, and a centrifugal force generating device, and thus is capable of employing the best method in accordance with the properties of the molten glass product as required. The glass melting furnace allows manufacture of a high quality glass product at low manufacturing cost by realizing the maximum fining effect with small energy.

(6) The glass melting furnace of the present invention has the heating means including at least one tank constituted by a heat resistant vessel, and thus is capable of attaining finally stabilized fining by: retaining and heating the molten glass; assuredly directing a dissolved gas out of a molten glass system for a glass product having any composition; and continuing degassing as long as the molten glass is present in the vessel.

(7) The glass melting furnace of the present invention has the noble gas dissolving means generating a flow of a helium and/or neon gas in a direction at a vector angle of 0° to 80°, 50° to 130°, or 100° to 180° with respect to a flow direction of the molten glass, and thus is capable of performing fining of various glass materials at a high level by optimally setting a flow direction based on whether the glass material allows easy diffusion and mixing of helium and/or neon or not.

(8) The glass melting furnace of the present invention has the noble gas dissolving means formed of a heat resistant metal and/or ceramics, and thus is capable of realizing stable manufacture of glass over a long period of time.

(9) The glass melting furnace of the present invention further includes the noble gas degassing means provided in at least one position selected from the inside, upper side, lower side, and side of the molten glass, and thus is capable of assuredly removing bubbles remained in the molten glass by rapidly degassing helium and/or neon diffused and mixed in the molten glass. The glass melting furnace allows efficient manufacture of a high quality glass product having a high viscosity, which is hardly formed into homogenous glass through a conventional fining method.

(10) The glass melting furnace of the present invention has the noble gas degassing means including at least one device selected from the group consisting of a heating device, a pressure reducing device, and a centrifugal force generating device, and thus is capable of assuredly performing a degassing operation from the molten glass allowing for selection of the device in accordance with not only the type of glass but also the use or required production of the glass.

(11) The glass melting furnace of the present invention allows efficient recycling of helium or neon generated through fining of the molten glass, and efficient use of an expensive helium or neon gas.

(12) The glass melting furnace of the present invention has the noble gas dissolving means provided with a plurality of noble gas inlets, and thus is capable of easily adjusting an introducing volume of helium or neon into the molten glass. The glass melting furnace allows mass production of a glass product having stable quality through precise adjustment under various furnace operation conditions of the glass melting furnace.

(13) The glass melting furnace of the present invention has the plurality of noble gas inlets provided on a hearth and/or on a furnace wall, and thus is capable of easily introducing helium or neon into the furnace without disordering a flow state of the molten glass in the furnace or greatly affecting the furnace temperature conditions, and of preventing reduction in life of manufacturing apparatus or peripheral devices due to introduction of helium or neon.

(14) The glass melting furnace of the present invention has the plurality of noble gas inlets each formed of a metal having a melting point of 1,000° C. or higher, and thus inhibits deformation or deterioration of the noble gas inlets in use over a long period of time, allows a steady volume of the noble gas to be introduced into the furnace or stable flow of the noble gas introduced, and allows sufficient intervals between periodic maintenance of the noble gas inlets.

(15) The glass melting furnace of the present invention has the noble gas dissolving means provided in a noble gas dissolving tank connected downstream of the melting tank, and thus is capable of assuredly and effectively performing fining by introduction of helium or neon. The glass melting furnace has the noble gas dissolving tank having an inner wall surface formed of a refractory brick having a refractory temperature of 1,200° C. or higher, or a heat resistant metal having a melting point of 1,200° C. or higher, and thus is capable of maintaining a state realizing homogeneous glass through fining by introduction of helium or neon for a sufficiently long period of time.

(16) The glass melting furnace of the present invention has the refractory brick containing at least one selected from the group consisting of $SiO_2$, $ZrO_2$, $Al_2O_3$, $MgO$, $Cr_2O_3$, $C$, and $WO_3$, or the heat resistant metal containing at least one metal selected from the group consisting of Pt, Ir, Os, Re, W, Ta, Rh, Hf, Ru, Tc, Pd, Mo, Ti, Zr, and Nb, and thus is capable of preventing melting of refractory brick or heat resistant metal into the glass or outflow of foreign substances as a glass defect by arbitrarily selecting an optimal material in consideration of various components in the glass, melting temperature, required high temperature strength with time, and the like.

(17) The method of manufacturing glass of the present invention allows rapid and efficient diffusion and mixing, and dissolution of helium and/or neon into the molten glass.

BRIEF DESCRIPTION OF THE DRAWINGS

FIG. 1 (X1) is a sectional view (taken along the line X1-X1 of FIG. 1(Y)) of the glass melting furnace seen from a side. FIG. 1 (X2) is a partially sectional view (taken along the line X2-X2 of FIG. 1(Y)) of a peripheral part of a noble gas dissolving device. FIG. 1(Y) is a sectional view of the glass melting furnace seen from an upper side.

BEST MODE FOR CARRYING OUT THE INVENTION

Hereinafter, a glass melting furnace and method of manufacturing glass according to the present invention will be described in detail based on examples.

Embodiment 1

Figure 1:
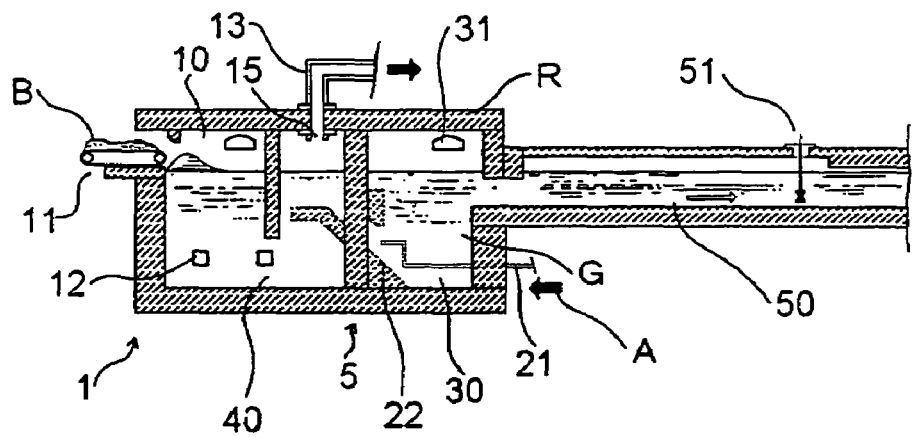
FIG. 1 is a sectional view of a glass melting furnace according to an embodiment of the present invention.
Figure 1:
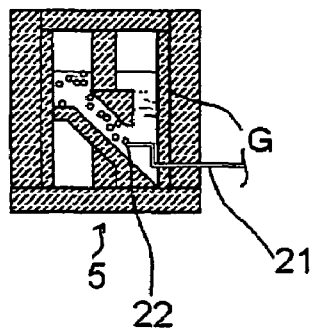
Figure 1:
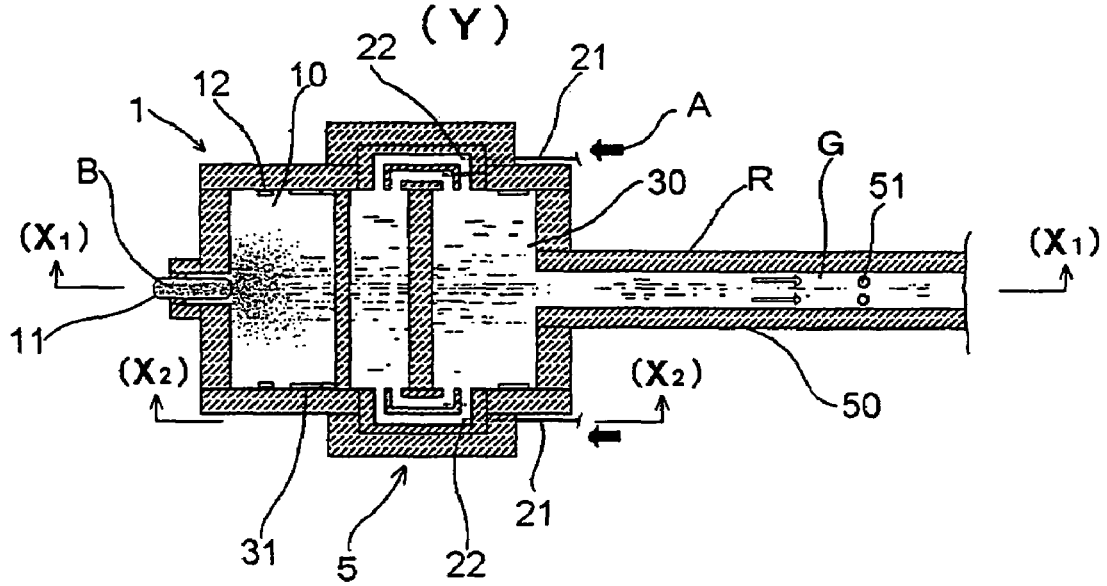

The inventors of the present invention have attempted to improve product yield than before by: applying the glass melting furnace of the present invention as a melting device for a glass product, which is silicate glass of a composition having an alkali content of 10 mass % or less and used as sheet glass for electronic components; and assuredly performing fining of the glass. The glass melting furnace of the present invention was realized by providing a noble gas dissolving device as noble gas dissolving means for diffusing and mixing, and dissolving helium and/or neon into molten glass, between a melting tank and fining chamber of a small continuous melting furnace conventionally used. FIG. 1 shows a constitution of a glass melting furnace 1. A refractory wall is provided between a melting tank 10 and a fining chamber 30. Molten glass G in the melting tank 10 flows into the fining chamber 30 through two noble gas dissolving devices 5 {see FIG. 1(Y)} respectively connected to both side walls of the melting tank 10.

A glass manufacturing process in the glass melting tank 1 is as described below. First, a glass raw material B for glass melting is prepared by weighing a plurality of raw materials satisfying desired specifications such as grain size, impurities, and water content, and mixing the plurality of raw materials homogeneously. At this time, a broken glass cullet is prepared in advance as a mixed batch as required. The glass raw material B is charged into the melting tank 10 with a raw material charging machine provided at a raw material inlet 11. The introduced glass raw material B is melted by heating with a sheet-like electrode 12 and a burner 31 in the melting tank 10. Molten glass G in liquid form through melting elevates in the tank through a throat part 40, then flows into the noble gas dissolving devices 5 respectively connected to both sides of the melting tank 10.

To exits of the molten glass G of the noble gas dissolving devices 5, a helium gas A is introduced through platinum/rhodium noble gas inlets 22 by directing heat resistant gas introduction tubes 21 from the outside of the furnace. The introduced helium gas A moves in the noble gas dissolving devices 5 while maintaining a flow direction at a vector angle of 180° with respect to a flow direction of the molten glass G. The helium gas A has gas ascending force in addition to diffusion force of the helium gas A itself, and moves while generating turbulence in the vicinity thereof with elevation of helium bubbles. The helium gas A is brought into a state of being easily dissolved in the molten glass G in tilted tubular paths inside the noble gas dissolving devices 5, partially diffused into the molten glass G, mixed by the turbulence, and dissolved in an atomic state. The helium gas A that remains undissolved is deaerated, degassed, and collected through a gas discharge tube 13 for collecting the helium gas provided at a ceiling of the melting tank 10 as a part of noble gas degassing means. The gas discharge tube 13 is connected to a device (omitted in the figure) having a heat resistant pumping function capable of adjusting a gas volume to be collected. A gas from expanded bubbles can be collected by sucking a helium gas dissolved in the molten gas G while an excess gas is collected. The gas discharge tube 13 also has a function of so-called a degassing device 15. The glass melting furnace employs a structure provided with two noble gas dissolving devices 5, and the two noble gas dissolving devices may be operated or one may be operated in accordance with a production.

The molten glass G in the melting tank 10 contains fine bubbles, supersaturated reaction gas components, and the like, and the helium gas acts on the fine bubbles to expand the bubbles by being diffused and mixed, and dissolved in the molten glass G. Helium atoms are diffused and mixed into the molten glass G to form bubbles of the supersaturated reaction gas components of the glass raw materials, which are expanded and deaerated. A part of the undeaerated helium atoms remains trapped in a network constructed by glass components.

The sufficiently fined molten glass G flows into a feeder 50 from the fining chamber 30, and is homogeneously mixed with two stirrers 51 provided in the feeder 50. Then, the molten glass G is formed into thin sheets with rolls (omitted in the figure) in a downstream forming region. The thus-manufactured sheet glass for electronic components conventionally had a rate of bubble defects of 7%. The thus-manufactured sheet glass for electronic components had a rate reduced to 0.2% with the glass melting furnace 1 of the present invention, to allow manufacture of sheet glass for electronic components having high quality. A helium content in the glass was 0.055 μl/g (0° C., 1 atm), which was a content within a predetermined range of 0.01 to 2 μl/g (0° C., atm).

Embodiment 2

Next, an embodiment employing a constitution suitable for melting a glass material having easier properties of diffusion and mixing, and dissolution of helium and/or neon into the molten glass compared with Embodiment 1 as a glass melting furnace for tubular glass used for electronic components is described.

Figure 2:
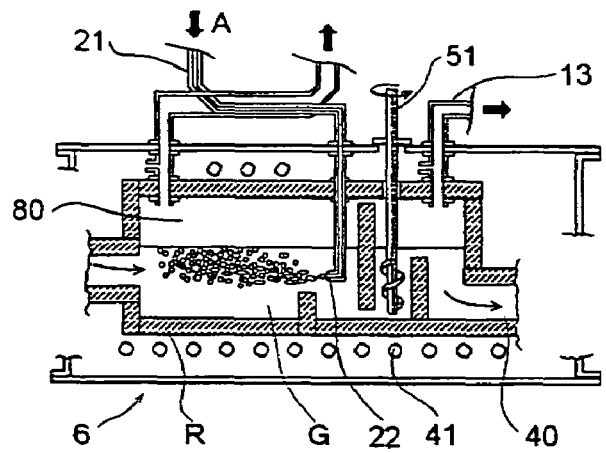
FIG. 2 is a partially sectional view of a noble gas dissolving device according to another embodiment of the present invention.

The melting furnace is very small as a continuous melting furnace, and has a disadvantage that unreacted raw material components are apt to flow out to the fining chamber because of a small volume of the melting tank. In order to overcome the disadvantage, the melting furnace employs a structure having a noble gas dissolving device connected downstream of the melting tank. FIG. 2 shows a partially sectional view of a noble gas dissolving device 6 employed in the glass melting furnace.

The molten glass G melted in the melting tank flows into the noble gas dissolving device 6 from the left side of FIG. 2. Meanwhile, the helium gas A is introduced in an opposite direction at a vector angle of 180° with respect to the flow direction of the molten glass G. The heat resistant gas introduction tube 21 employs a platinum/rhodium alloy, and bubbles are controlled to have an average diameter of 60 mm or less by narrowing a tip part and arbitrarily adjusting a flow rate. The helium gas A is introduced from a direction opposite to the flow of the molten glass G, to thereby allow rapid progress of mixing and dissolution of helium atoms into the molten glass G. The diameters of the bubbles of the gas derived from the remaining glass supersaturated through the reaction of glass raw materials expand through diffusion of the helium gas A, to thereby accelerate deaeration of bubbles from the molten glass G.

The remaining helium gas A is accumulated in a gas accumulation chamber 80 in an upper part of the noble gas dissolving device 6 as a part of the noble gas degassing means, and is collected through the gas discharge tube 13 provided here. The collected gas has high temperatures, and preheating of the helium gas A to be introduced is performed by utilizing the heat. That is, a double tube structure allowing a flow of a waste gas outside of the heat resistant gas introduction tube 21 is employed, to thereby allow efficient operation.

Finally, the molten glass G is homogeneously mixed with a stirrer 51, which is a stirring device provided downstream of the noble gas dissolving device 6, into a state of having no insufficiently mixed parts. The molten glass G flows out of the noble gas dissolving device 6, flows into the fining chamber, flows through the fining chamber, and reaches the forming region, to thereby allow forming of the tubular glass.

The conventional manufactured tubular glass for electronic components had about 10 bubbles of very small diameters of about 0.2 mm per 100 g of glass. The thus-manufactured tubular glass for electronic components had an improved rate of bubble defects of about 0.1 bubble per 100 g glass, and profitable products were able to be supplied in accordance with market demands because of reduced rate of bubble defects. A helium content in the glass was 0.046 μl/g (0° C., 1 atm), which was a content within a predetermined range of 0.001 to 2 μl/g (0° C., atm).

Embodiment 3

Figure 3:
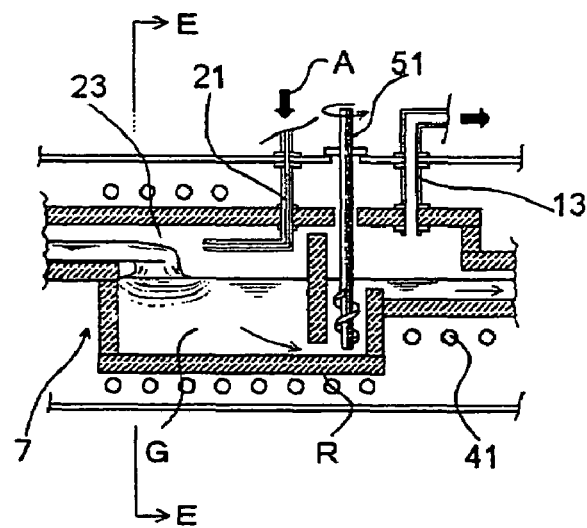
FIG. 3 is a partially sectional view of a noble gas dissolving device according to still another embodiment of the present invention.
Figure 4:
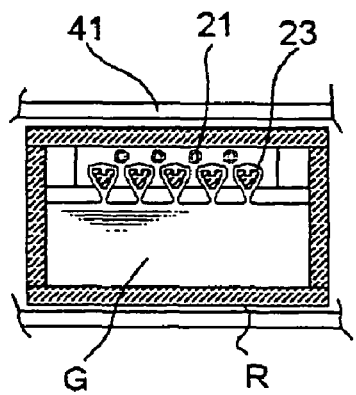
FIG. 4 is a sectional view taken along the line E-E of FIG. 3.

Next, an embodiment employing a glass melting furnace of the present invention as an apparatus for manufacturing display glass is described. Because bubbles in an image display part are highly visible, glass products used for such an application require stricter management of bubble quality than that of glass products used for other applications, and bubbles are perceived as critical defects. FIG. 3 shows a longitudinal sectional view of a noble gas dissolving device 7 provided in the glass melting furnace of the present invention, and FIG. 4 shows a transverse sectional view of the E part of FIG. 3. The raw materials charged into the melting tank are melted by heating with a burner and by direct heating with a platinum electrode, and the molten glass G flows into the noble gas dissolving device 7 from the left side of FIG. 3. As shown in FIGS. 3 and 4, heat resistant tubs 23 are provided inside the noble gas dissolving device 7. While the molten glass G flows along the heat resistant tubs 23, the helium gas A is introduced in a flow direction at a vector angle of 180° from the heat resistant gas introduction tube 21 provided in an upper side of the molten glass G. The helium gas A is diffused and mixed into the molten glass G in the heat resistant tubs 23, and dissolved as helium in an atomic state.

An upper part of the molten glass G in the noble gas dissolving device 7 is filled with the introduced helium gas A, to thereby realize an environment facilitating diffusion and mixing, and dissolution of the helium gas A into the molten glass G while the molten glass G falls from the heat resistant tubs 23. In this way, helium atoms are dissolved in the molten glass G, and act on bubbles of very small diameters remained in the molten glass G to expand. Then, the molten glass G flows out to the fining chamber provided on the right side of FIG. 3, to thereby accelerate fining of the molten glass.

The glass melting furnace of the present invention as shown in FIGS. 3 and 4 is used, to thereby reduce a rate of fine bubble defects, which causes problems in the image display part, by 9% compared with that of the conventional melting furnace and allow supply of glass products for display devices and having high quality.

Embodiment 4

If powder glass used for displays or the like has fine bubbles in the glass, the powder glass may foam when a glass member for display or the like is sealed with the powder glass and may cause problems of affecting various properties such as strength and brightness of the display. Thus, the inventors of the present invention have conducted studies on whether the glass melting furnace of the present invention can be applied to melting of such powder glass.

Figure 5:
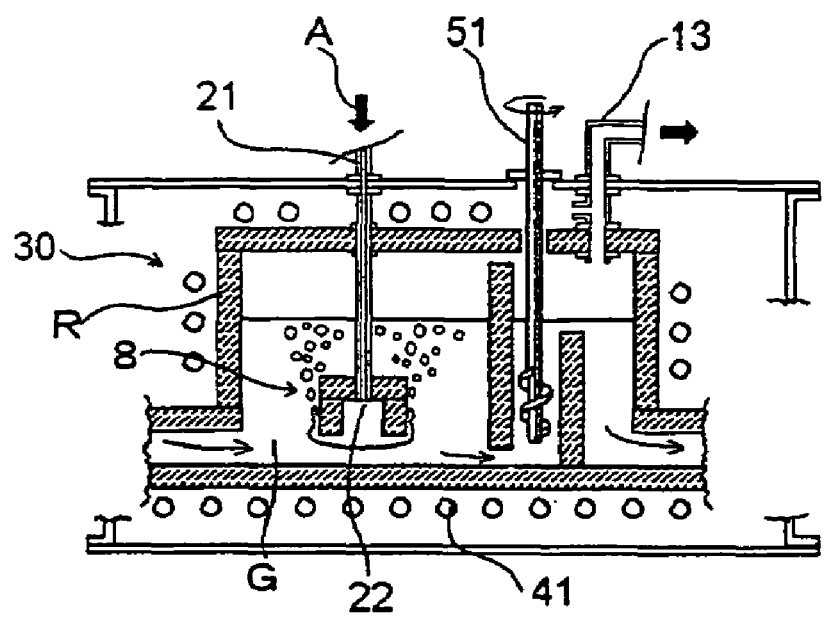
FIG. 5 is a partially sectional view of a noble gas dissolving device according to yet another embodiment of the present invention.
Figure 6:
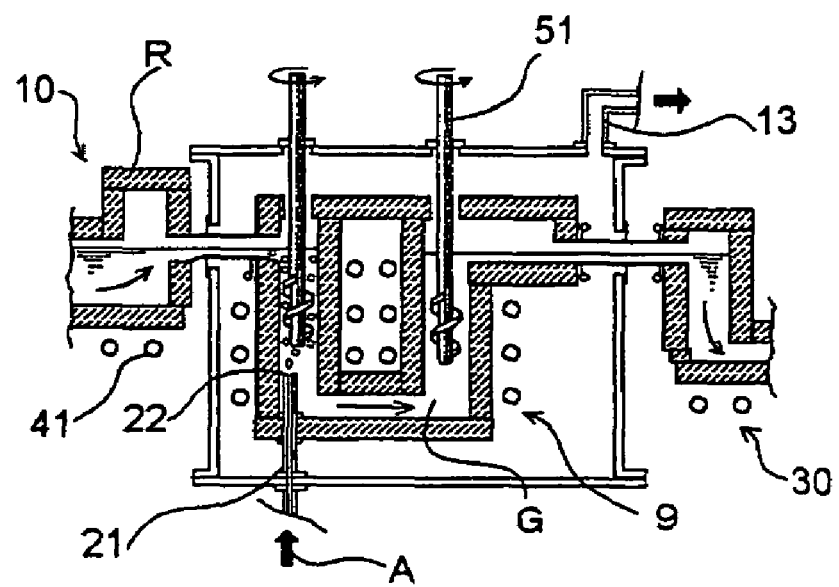
FIG. 6 is a partially sectional view of a noble gas dissolving device according to still yet another embodiment of the present invention.

Two embodiments which attempt to provide the noble gas dissolving device in the glass melting furnace are described. FIG. 5 shows a partially sectional view of the fining chamber 30 of the glass melting furnace provided with a noble gas dissolving device 8, and FIG. 6 shows a partially sectional view of a noble gas dissolving device 9. The noble gas dissolving device 8 of FIG. 5 was initially used. In this case, after the raw materials are melted in the melting tank, the molten glass G flows into the fining chamber 30 from the left side of FIG. 5. The noble gas dissolving device 8 is provided to be immersed in the molten glass G in the fining chamber 30. A gas containing 5% neon and 95% helium in volume ratio is introduced from an upper part of the fining chamber 30 through the platinum/rhodium gas introduction tube 21. The gas is blown out from the platinum/rhodium noble gas inlet 22, accumulated in the tank, and heated by the molten glass G in the vicinity thereof. The gas converts into helium/neon mixed gas bubbles by ascending force from the vicinity of the noble gas dissolving device 8, and elevates in a direction at a vector angle of 90° with respect to a flow direction of the melting glass G.

A fining effect in the noble gas dissolving device 8 was significantly improved compared with that of the melting furnace employing no noble gas dissolving device 8 with a bubble generation rate reduced by 12% during a final sealing test. However, substantial modifications were made to provide a structure as shown in FIG. 6, for attaining a fining effect at a higher level. FIG. 5 employs a structure provided with the noble gas dissolving device 8 in the fining chamber 30. FIG. 6 employs a structure provided with a noble gas dissolving device 9 between the melting tank 10 and the fining chamber 30 by changing a structure allowing introduction of the helium gas A in the fining chamber 30 of FIG. 5 to a structure allowing introduction of the helium gas A into the molten glass G at a position further upstream. The molten glass G subjected to primary glass melting reaction in the melting tank 10 flows into the noble gas dissolving device 9 from the left side of FIG. 6, and is provided with rotational motion with a platinum/rhodium stirrer 51 driven by an upper part of the noble gas dissolving device 9. Meanwhile, the helium gas A is preheated and introduced into the noble gas dissolving device 9 from a lower part of the stirrer 51. The helium gas A elevates in a direction at a vector angle of 90° with respect to a flow direction of the molten glass G generated by the stirrer 51. The helium gas A is diffused and mixed, and dissolved in an atomic state while passing and elevating through the stirrer 51. The excess helium gas A is collected through the gas discharge tube 13, which is a part of the degassing device, and is recycled.

The molten glass G passes through a throat-like structure in the noble gas dissolving device 9, is mixed into a homogeneous state with the stirrer 51, and then flows into the fining chamber 30.

The glass melting furnace of the present invention provided with improvements as shown in FIG. 6 is employed, to thereby provide an additional reducing effect on a bubble generation rate and allow manufacture of a homogenous and sufficiently fined glass product.

Embodiment 5

Figure 7:
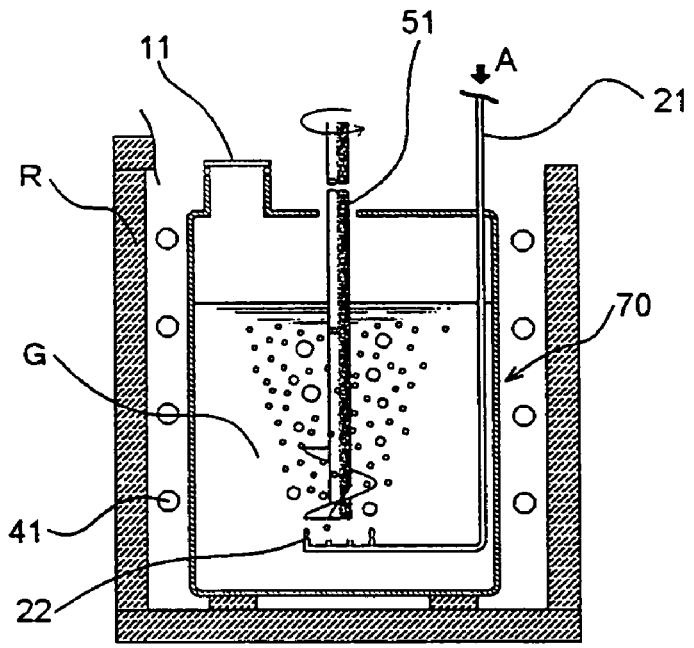
FIG. 7 is an explanatory drawing regarding a test of the present invention performed in a laboratory.

Final improvements on mode of FIG. 6 were made by conducting a preliminary test in a laboratory for providing improvements as shown in FIG. 6. FIG. 7 shows an explanatory drawing regarding equipment used for the preliminary test.

The same powder glass for display or the like as that melted in the glass melting furnace of FIG. 5 was used in the test. The gas is bubbled in the molten glass G for the purpose of diffusing the helium gas A into the molten glass G. In the test, the helium gas A is introduced by bubbling the gas into the molten glass G from the platinum/iridium noble gas inlet 22 provided at the tip of the heat resistant bubbling tube (that is, the gas introduction tube 21) provided in the vicinity of a bottom of a platinum crucible 70. A flow of the molten glass G at a vector angle of 90° with respect to bubbles of the helium gas A elevating through the molten glass G is formed, and the bubbles themselves are broken into bubbles having reduced diameters in the molten glass G with spinning blades of the stirrer 51, to thereby obtain bubbles having a sphere equivalent average diameter of 40 mm or less. Thus, an elevating of bubbles is reduced in the molten glass G, to facilitate contact between the helium gas A and the molten glass G over a long period of time.

As a result, a helium content in the glass after the test was increased by 20% compared with that in the glass obtained by simply bubbling the helium gas A from the bottom of the crucible 70 regardless of the same helium flow rate. Further, the final bubble content in the glass was improved compared with that in the glass obtained by introducing the helium gas A through simply bubbling. A heat reboiling test of the obtained glass confirmed no concern of reboiling, and the glass had excellent quality.

Embodiment 6

Figure 8:
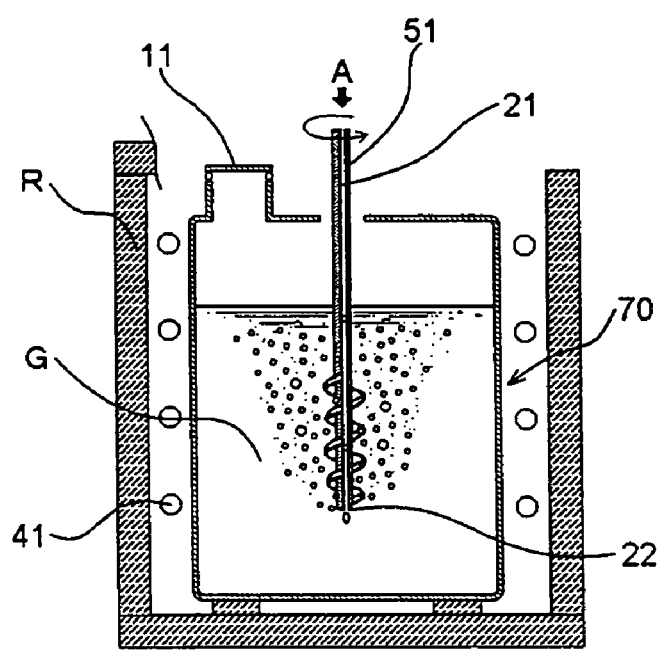
FIG. 8 is an explanatory drawing regarding another test of the present invention performed in a laboratory.

Next, based on the results of FIG. 5, the following tests were conducted for realizing effective bubbling of bubbles having even smaller diameters. The test was conducted for a composition of capillary glass used for lamps. FIG. 8 shows an explanatory drawing regarding test equipment.

Based on the results of Embodiments 4 and 5, a bubble diameter was further reduced to a sphere equivalent average diameter of 30 mm or less, and the stirrer 51 having both functions of the heat resistant gas introduction tube 21 and a stirrer was designed. Studies were conducted on whether efficient manufacture is possible by using the stirrer. The stirrer 51 having a rotational axis of a tubular shape was employed, which allows introduction of the helium gas A into the molten glass G from the platinum noble gas inlet 22 provided at the tip of the stirrer 51.

It was confirmed that the bubble diameter of the helium gas A can be reduced by: bubbling helium into the molten glass G maintained at 1,400° C. from the stirrer 51 provided as shown in FIG. 8; and rotating the stirrer 51.

The molten glass G melted in advance at 1,400° C. or 1,350° C. for 2 hours was poured into the platinum/rhodium crucible 70 while the glass had a high temperature, and helium was bubbled from the noble gas inlet 22 provided at the tip of a stirrer-type helium introduction tube 51 (21) at 1,400° C. for 2 hours. The number of bubbles were measured, resulting in 10 to 50 bubbles/kg for the molten glass heated to 1,400° C. to 1,400° C., and 0 to 10 bubbles/kg for the molten glass heated to 1,350° C. to 1,400. As a result, findings providing effective manufacture conditions were able to be obtained by using the stirrer 51 and employing helium bubbling.

Embodiment 7

Figure 9:
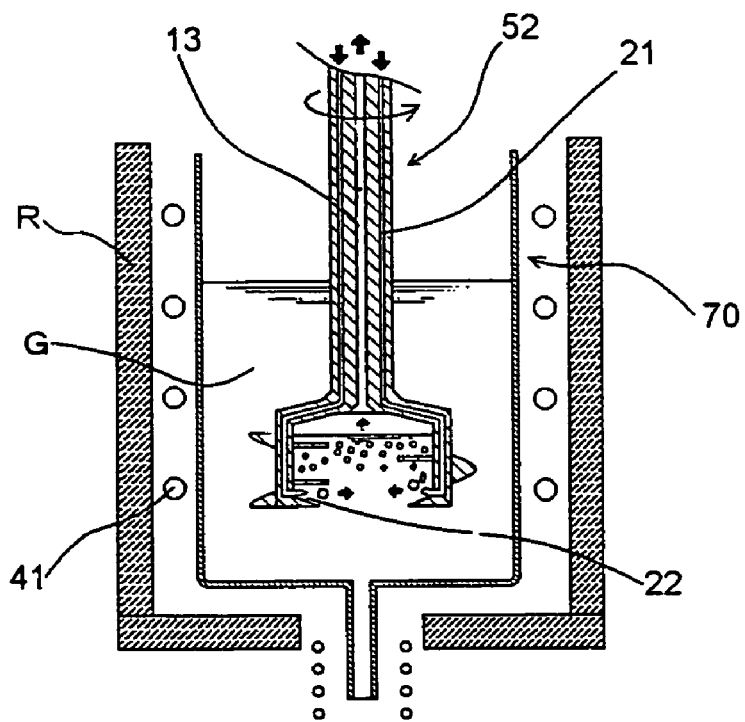
FIG. 9 is a partially sectional view of a noble gas dissolving device according to an embodiment of the present invention.

Next, an embodiment employing the glass melting furnace of the present invention as a glass melting furnace for manufacture of glass products used for optical components is described. Because the glass is manufactured through a batch process using a platinum pot 70, has a high rate of bubble defects of about 16%, and has a low product yield, the inventors of the present invention have attempted to apply the present invention as a countermeasure. As shown in FIG. 9, a noble gas dissolving device 52 is immersed in the molten glass G, and the helium gas A is blown out from the noble gas inlet 22 to introduce the helium gas A into the noble gas dissolving device 52 in the molten glass G. The introduced helium gas A is stirred with blades inside the noble gas dissolving device 52 to provide bubbles having an average diameter of 50 mm or less. A flow of the helium gas A is generated in a direction at a vector angle of 90° with respect to the flow of glass in an upward direction generated by convention. The helium gas A is diffused and mixed into the molten glass G, and thus is dissolved into the molten glass G in an atomic state.

The present invention was applied, to thereby reduce a rate of bubble defects to about 8%, which was conventionally about 16%, improve product yield, and reduce product cost. A measured helium content in the glass was 0.033 μl/g (0° C., 1 atm), which was a content within a predetermined range of 0.001 to 2 μl/g (0° C., atm). The present invention was applied to facilitate fining of the glass, which conventionally had difficulties in fining, and allow supply of homogenous glass in accordance with market demands.

Embodiment 8

Finally, an embodiment employing the melting furnace and method of manufacturing glass of the present invention for manufacture of thin sheet glass installed in an image display part of a liquid crystal display device is described.

Non-alkali glass has been manufactured by using a relatively large glass melting furnace, but improvements for redesigning a melting device into a high capacity melting device have been required with recent technical innovation and market expansion. The inventors of the present invention have attempted to improve the glass melting furnace into the glass melting furnace of the present invention providing good results in various tests, in addition to a series of improvements on such a device.

Figure 10:
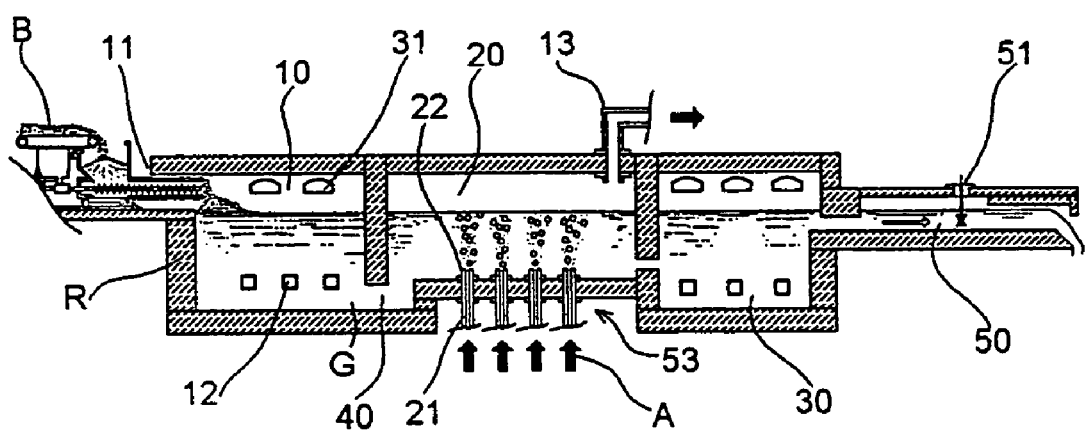
FIG. 10 is a sectional view of a glass melting furnace according to another embodiment of the present invention seen from a side.
Figure 11:
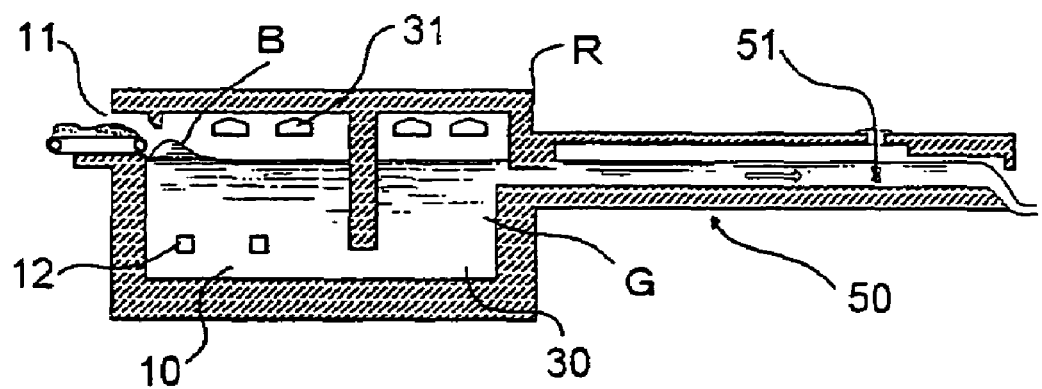
FIG. 11 is a sectional side view of a conventional continuous melting furnace.
Figure 12:
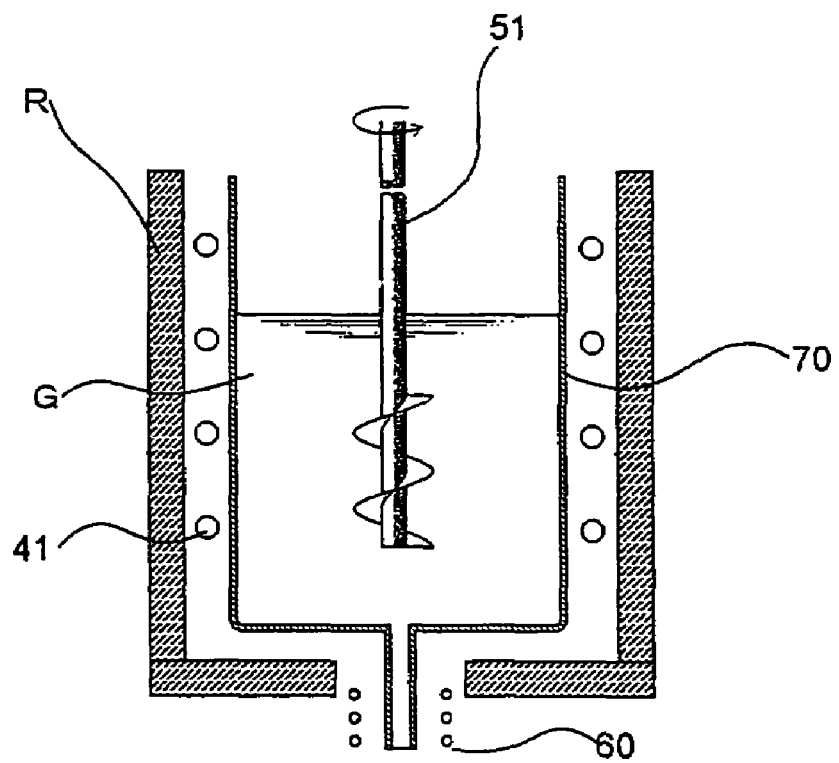
FIG. 12 is a sectional side view of a conventional batch furnace.

FIG. 10 shows a sectional view of the glass melting furnace after the improvement. The glass raw material B is mixed with a large raw material mixer, supplied to a screw charging machine provided at the raw material inlet 11 by a belt conveyor, and charged into the melting tank 10 of the glass melting furnace at a predetermined rate. In the melting tank 10, the charged glass raw material B is melted by heating with the burner 31 and by heating with the electrode 12, to form the molten glass G. Then, the molten glass G flows into a tank additionally provided as a noble gas dissolving tank 20 through a throat 40. The noble gas dissolving tank 20 is provided with a noble gas dissolving device 53 (referred to as a bubbler module 53). The bubbler module 53 is provided with a plurality of, for example, sixteen noble gas inlets 22 for introducing a helium gas or neon gas supplied to a hearth by the heat resistant gas introduction tubes 21 into the noble gas dissolving tank 20 (FIG. 10 shows four noble gas inlets 22 aligned in a flow direction of the molten glass, but the noble gas inlets 22 are arranged in four rows in a direction perpendicular to the flow direction of the molten glass. A total of sixteen inlets are provided.). Each of the noble gas inlets 22 on the hearth of the bubbler module 53 is coated with a 15% platinum (Pt)/rhodium (Rh) alloy. A density of the noble gas inlets 22 provided in the bubbler module 53 is set to 10,000 inlets/m² or less.

From the bubbler module 53 having sixteen noble gas inlets 22, bubbles of the helium gas A having a purity of 99% are blown into the molten glass G at a supply volume providing an average bubble diameter of 80 mm or less, to thereby cause diffusion of helium atoms from the helium bubbles into the molten glass G. The noble gas dissolving tank 20 is provided with an electrode (omitted in the figure) or the gas discharge tube 13 in addition to the bubbler module 53, and the helium gas accumulated above the molten glass G may be collected after the helium gas is blown out from the bubbler module 53 and elevates through the molten glass G. The noble gas melting tank 20 employs electrocast refractory bricks containing 80 mass % or more zirconia as refractory materials for the inner wall and hearth of the tank such that the noble gas melting tank 20 can be heated to high temperatures of 1,500° C. or higher. A high temperature part of a metal line (line representing an interface between molten glass and melting atmosphere on a furnace wall) employs a refractory material coated with platinum. This coating is for preventing fluctuation of the metal line by the helium gas or neon gas blown out from the bubbler module to cause significant progress in corrosion of the refractory material in the metal line part.

Even in the noble gas dissolving tank 20, a part of a fining reaction for releasing fine reaction bubbles in the molten glass G starts. Actual fining is performed by heating the molten glass G in the fining chamber 30 after the molten glass flows out of the noble gas dissolving tank 20, to thereby form homogenous molten glass. The molten glass G flows into a feeder 50, and is subjected to final homogenization operation with a stirrer 51. The molten glass G flows into a forming region, to be formed into thin sheet glass.

Such a glass melting furnace is used to allow reduction of bubbles each having a fine size causing problems in forming of thin sheet glass with a large area and improvement in efficiency percentage. Such a glass melting furnace provides glass having a helium content falling within a predetermined range of 0.0001 to 2 μl/g (0° C., atm).

The invention claimed is:

1. A glass melting furnace for melting glass raw materials by heating to form molten glass, characterized by comprising: an inlet for charging glass raw materials; an outlet for taking out molten glass; a melting tank for retaining the glass raw materials and the molten glass for a predetermined period of time; heating means for heating the glass raw materials and molten glass charged into the melting tank; and noble gas dissolving means for supplying helium and/or neon from a noble gas inlet, and diffusing and mixing helium and/or neon into the molten glass to dissolve a predetermined concentration or more of helium and/or neon in the molten glass, wherein the noble gas dissolving means is provided in a noble gas dissolving tank connected downstream of the melting tank.

2. A glass melting furnace according to claim 1, characterized in that a concentration of helium and/or neon to be dissolved is 0.0001 μl/g (0°C. 1 atm) or more.

3. A glass melting furnace according to claim 1, characterized in that the noble gas dissolving means is at least partially immersed in the molten glass.

4. A glass melting furnace according to claim 1, characterized in that the noble gas dissolving means is provided in at least one position selected from an inside, upper side, lower side, and side of the molten glass.

5. A glass melting furnace according to claim 1, characterized in that the noble gas dissolving means is formed of a heat resistant metal and/or ceramics.

6. A glass melting furnace according to claim 1, characterized by further comprising noble gas degassing means for degassing a gas containing helium and/or neon from the molten glass after helium and/or neon is diffused and mixed into the molten glass, which is provided in at least one position selected from the inside, upper side, lower side, and side of the molten glass.

7. A glass melting furnace according to claim 6, characterized in that the noble gas degassing means comprises at least one device selected from the group consisting of a heating device, a pressure reducing device, and a centrifugal force generating device.

8. A glass melting furnace according to claim 7, characterized in that the noble gas degassing means includes a noble gas collection chamber provided on the upper side the molten glass.

9. A glass melting furnace according to claim 1, characterized in that the noble gas dissolving means is provided with a plurality of noble gas inlets.

10. A glass melting furnace according to claim 9, characterized in that the plurality of noble gas inlets are provided on a hearth and/or on a furnace wall.

11. A glass melting furnace according to claim 10, characterized in that the plurality of noble gas inlets are each formed of a metal having a melting point of 1,000° C. or higher.

12. A glass melting furnace according to claim 1, characterized in that a fining chamber is connected downstream of the noble gas dissolving tank.

13. A glass melting furnace according to claim 1, characterized in that the noble gas dissolving tank has an inner wall surface formed of refractory bricks having a refractory temperature of 1,200° C. or higher, or a heat resistant metal having a melting point of 1,200° C. or higher.

14. A glass melting furnace according to claim 13, characterized in that the refractory brick contains at least one selected from the group consisting of $SiO_2$, $ZrO_2$, $Al_2O_3$, MgO, $Cr_2O_3$, C, and $WO_3$.

15. A glass melting furnace according to claim 13, characterized in that the heat resistant metal contains at least one selected from the group consisting of Pt, Ir, Os, Re, W, Ta, Rh, Hf, Ru, Tc, Pd, Mo, Ti, Zr, and Nb.

16. A method of manufacturing glass for melting glass raw materials by heating to form molten glass, characterized by comprising: introducing bubbles containing helium and/or neon and having an average diameter of 150 mm or less into molten glass; diffusing and mixing helium and/or neon into the molten glass to incorporate a predetermined volume of helium and/or neon in the molten glass; and homogeneously stirring the molten glass with a stirring device at a downstream of a flow of the molten glass.

* * * * *